United States Patent

Heimann et al.

[11] Patent Number: 5,265,833
[45] Date of Patent: Nov. 30, 1993

[54] MOUNTING BRACKET FOR HAND SHOWER

[75] Inventors: Bruno Heimann, Fröndenberg-Ardey; Detlef Hochstein, Hemer, both of Fed. Rep. of Germany

[73] Assignee: Friedrich Grohe Aktiengesellschaft, Hemer, Fed. Rep. of Germany

[21] Appl. No.: 909,956

[22] Filed: Jul. 7, 1992

[30] Foreign Application Priority Data

Jul. 23, 1991 [DE] Fed. Rep. of Germany .... 4124352.8

[51] Int. Cl.$^5$ .............................................. E03C 1/06
[52] U.S. Cl. ........................................ 248/75; 4/615; 239/282; 248/291
[58] Field of Search ................. 248/75, 291, 220.2; 4/615; 239/273, 282, 530, 600

[56] References Cited

U.S. PATENT DOCUMENTS

| 4,747,569 | 5/1988 | Hoshino | 248/220.2 |
| 4,964,573 | 10/1990 | Lipski | 248/75 |

FOREIGN PATENT DOCUMENTS

| 320537 | 2/1975 | Austria . | |
| 7521122 | 2/1976 | Fed. Rep. of Germany . | |
| 8504974 | 7/1989 | Fed. Rep. of Germany . | |
| 4040668 | 7/1992 | Fed. Rep. of Germany | 4/615 |
| 2492912 | 4/1982 | France . | |
| 466173 | 1/1969 | Switzerland | 248/75 |
| 2192530 | 1/1988 | United Kingdom . | |

OTHER PUBLICATIONS

Search Report for EP 92 11 1935 and translation thereof, listing the above patents.

Primary Examiner—Hien H. Phan
Attorney, Agent, or Firm—Herbert Dubno; Andrew Wilford

[57] ABSTRACT

A mounting bracket for a hand shower having a support stem has a support adapted to be stationarily fixed, a holder formed with a forked seat shaped to receive the hand-shower stem, and interengaging formations on the holder and support for pivoting of the holder on the support about a normally horizontal axis while retaining the holder and support against relative axial movement. An array of radially extending ridges formed on the support, surrounding the axis, and projecting toward the holder engage with complementary ridges formed on a flange of a retaining element rotationally coupled to the holder. A locking bolt axially fixed in the support axially presses the retaining-element ridges against the support ridges so that the holder can be pivoted about the axis on the support with elastic deformation of the flange.

11 Claims, 5 Drawing Sheets

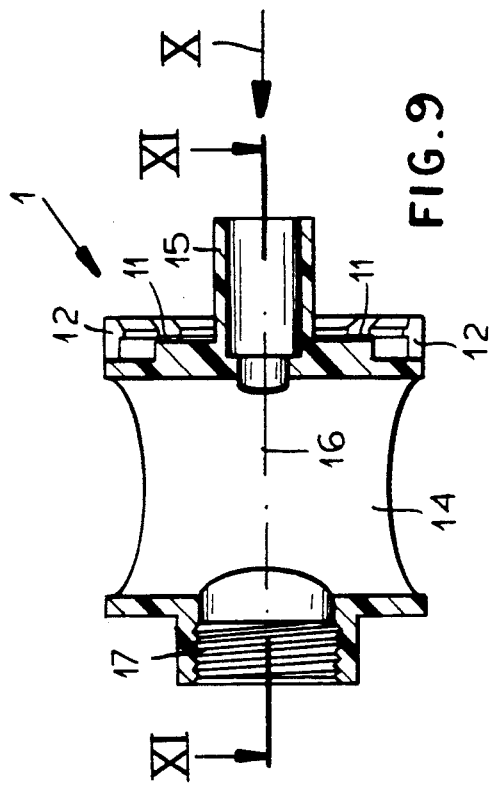
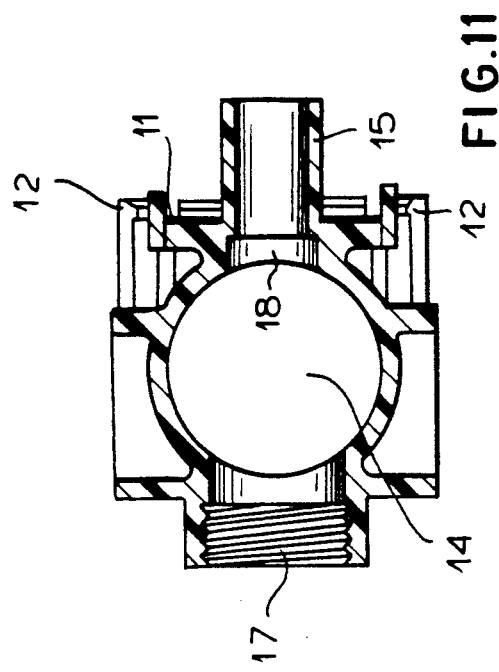
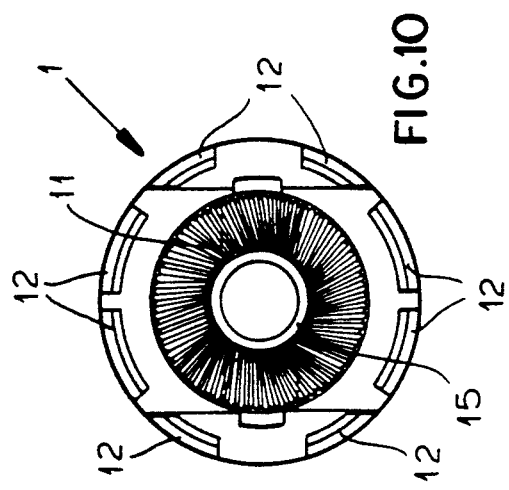

MOUNTING BRACKET FOR HAND SHOWER

FIELD OF THE INVENTION

The present invention relates to a mounting bracket for a hand shower. More particularly this invention concerns such a bracket which allows for angular adjustment of the hand shower.

BACKGROUND OF THE INVENTION

A standard telephone-type or hand shower has a handle or grip whose one end is formed as a shower head and whose opposite end is connected to a hose that in turn is connected to the water supply. While such a shower is intended to be held and directed by the user, it is also standard to provide a mounting bracket that can hold the it while the user is soaping up or just for standard stationary shower use.

Accordingly Austrian patent 320,537 of S. Juhlin describes a bracket having a body adapted to slide along a vertical wall-mounted support rod or tube so that the height of the shower when mounted stationary can be adjusted. The bracket is formed with a throughgoing passage that snugly surrounds the support rod and has a holding fork into which the rear end of the shower itself fits complementarily and which can rotate about an axis perpendicular to the rod on the holder. A clamping device allows the holder to be tightened to fixedly grip the rod and simultaneously fixes the angular orientation of the fork on the holder. Thus whenever the shower height or angle is to be adjusted by loosening the clamp, this action similarly loosens the other setting, even if the user does not what to change this other setting.

German utility model 7,521,122 describes another system with a clamp serving solely to secure the holder on the rod and with a fork that is formed of ridged elements that can pivot in the holder. Such an arrangement is fairly stiff and the interfitting ridged parts are subject to considerable wear. When they are vacuum plated with chromium, as is frequent, it is standard for the plating to wear off, ruining the appearance of the unit. Furthermore this arrangement is a relatively expensive and complicated device.

OBJECTS OF THE INVENTION

It is therefore an object of the present invention to provide an improved mounting bracket for a hand shower.

Another object is the provision of such an improved mounting bracket for a hand shower which overcomes the above-given disadvantages, that is which is of simple and inexpensive construction, and that allows easy and relatively wear-free angular adjustment of the shower head.

SUMMARY OF THE INVENTION

A mounting bracket for a hand shower having a support stem has according to the invention a support adapted to be stationarily fixed, a holder formed with a forked seat shaped to receive the hand-shower stem, and interengaging formations on the holder and support for pivoting of the holder on the support about a normally horizontal axis while retaining the holder and support against relative axial movement. An array of radially extending ridges formed on the support, surrounding the axis, and projecting toward the holder engage with complementary ridges formed on a flange of a retaining element rotationally coupled to the holder. A locking bolt axially fixed in the support axially presses the retaining-element ridges against the support ridges so that the holder can be pivoted about the axis on the support with elastic deformation of the flange.

Thus with this system angular adjustment of the hand shower takes place with elastic deformation of the retaining element. It is relatively easy to construct the ridges such that they provide a relatively stiff coupling that can nonetheless be forcibly overcome with nothing more than elastic deformation of the flange. According to the invention the flange is inclined at an angle of about 5° to the axis and the ridges of the support extend perfectly perpendicular to the axis, so that the device is prestressed. The flange is comprised of a plurality of identical circularly segmental segments and has about 54 such ridges which have flank angles of about 100°.

The bolt according to the invention has axially extending legs having outwardly projecting feet that are elastically radially deflectable and that are axially engaged with the support. Furthermore the rotational-coupling formations include radially outwardly projecting fins formed on the retaining element and respective radially inwardly open seats formed on the holder and receiving the fins. The locking bolt itself is tubular and the holder is formed of an outer part formed with the forked seat and formed on the axis with a pin engaging coaxially in the locking bolt, and an annular inner part fixed on the outer part and formed with a radially open groove. The support has an annular array snap fingers with radially projecting ends engaged in the groove and the array is centered on the axis. The groove of the inner part opens radially outward and a cover ring overlies the snap fingers and retains them in the inner-part groove.

The assembly according to the invention further has a vertical support rod and the support is formed with a vertically throughgoing passage through which the rod passes and a threaded clamp element threaded in the support and engageable with the rod to lock the support on the rod at any position therealong.

BRIEF DESCRIPTION OF THE DRAWING

The above and other objects, features, and advantages will become more readily apparent from the following, reference being made to the accompanying drawing in which:

FIG. 9 is a vertical section through the support of the assembly;

FIG. 10 is an end view taken in the direction of arrow X of FIG. 9;

FIG. 11 is a section taken along line XI—XI of FIG. 8;

DESCRIPTION

Figure 1:
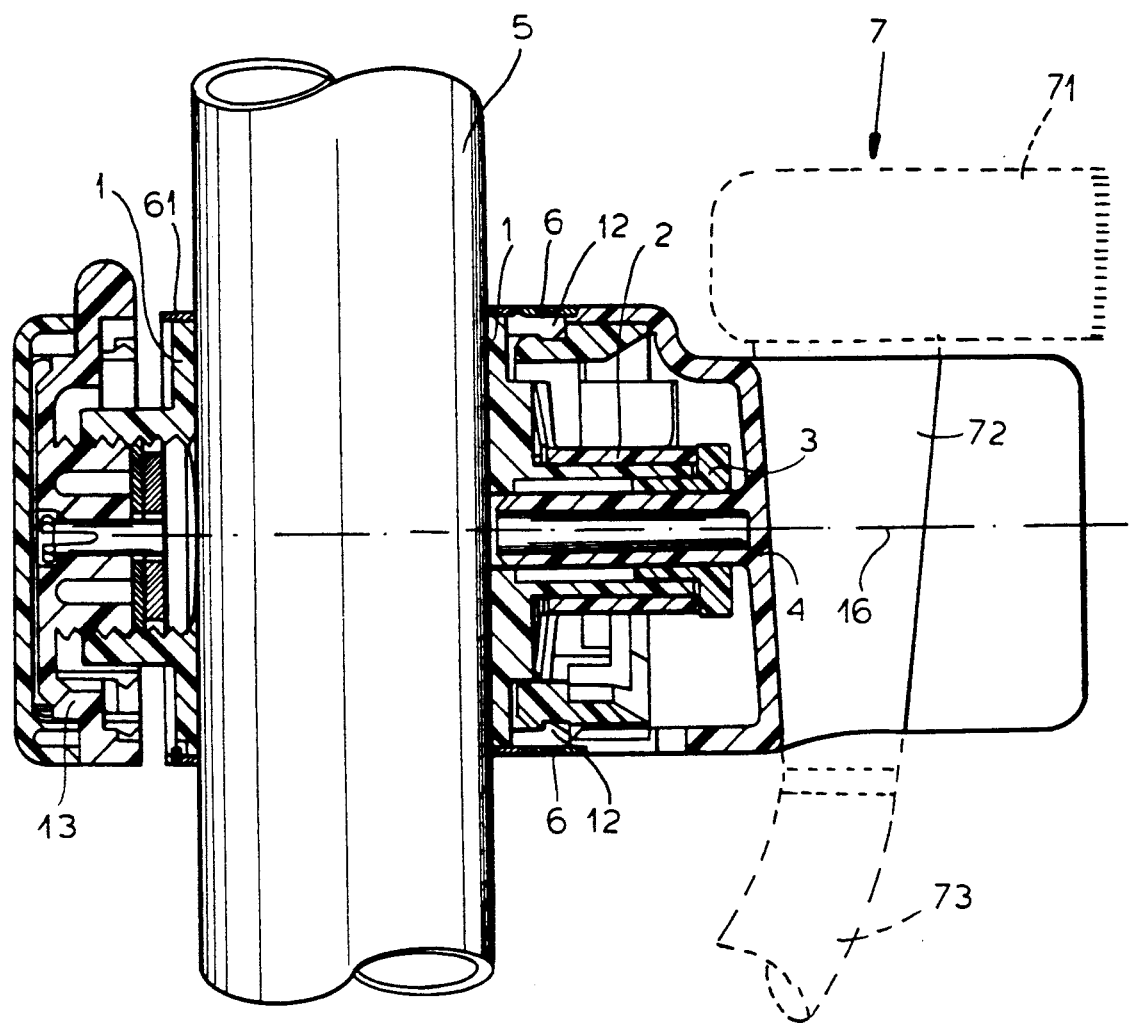
FIG. 1 is a vertical section through a shower assembly according to the invention.

As seen in FIG. 1 the instant invention basically comprises a support 1, a retaining element 2 (See also FIGS. 4 through 6.), a locking bolt 3 (See also FIGS. 7 and 8.), a holder 4 (See also FIGS. 2 and 3.), a support tube 5, a cover sleeve 61, (See also FIGS. 12 through 14.), a ring 6, and a hand shower 7. All of the parts 1 through 4 are normally molded of a durable synthetic resin, making it very easy to impart to them the complex shapes described below. A nut 13 in the support 1 allows it to be clamped on the cylindrical tube 5 anywhere along its length. As described U.S. Pat. No. 3,404,410 of Sumida, this tube 5 may also be the water supply tube for the hand shower 7. The hand shower 7 itself has a grip 71 provided on one end with an unillustrated shower head and on its opposite end with a mounting stem 72 fitted into the holder 4. A hose 73 extends from the bottom of the stem 72 to the water supply.

Figure 2:
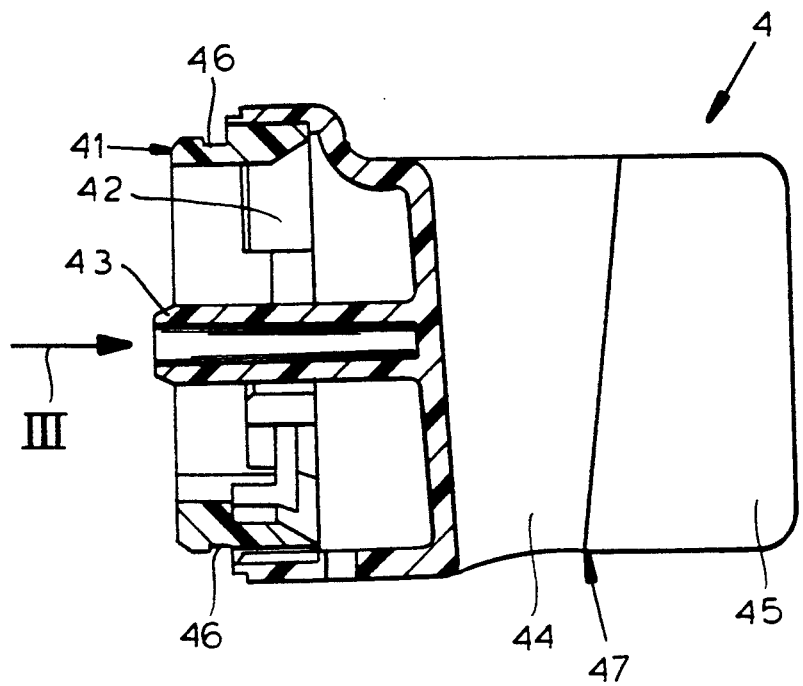
FIG. 2 is a vertical section through the holder of the assembly.
Figure 3:
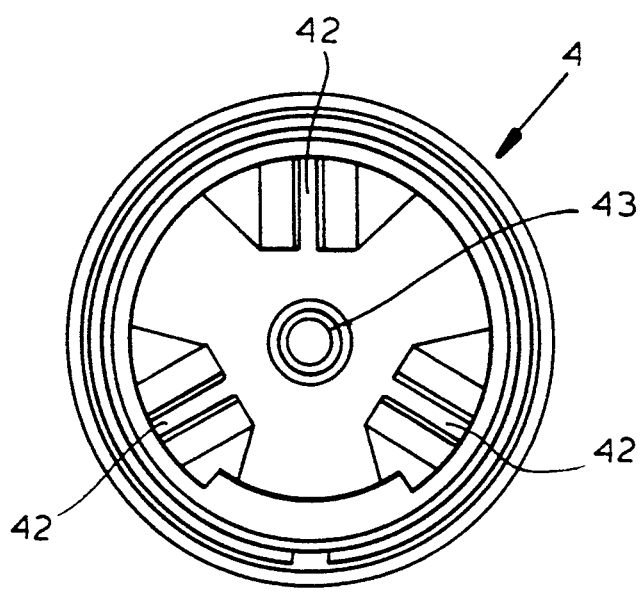
FIG. 3 is an end view taken in the direction of arrow III of FIG. 2.

According to the invention as shown in FIGS. 2 and 3 the holder 4 is made of two welded-together parts 41 and 47. The part 41 is a stiff plastic ring 41 formed with three angularly equispaced radially inwardly open notch seats 42 and with a radially outwardly open annular groove 46. The part 47 is fork-shaped and formed with a downwardly tapered seat 44 adapted to receive the stem 72 of the hand shower 7 and with an outwardly open slot 45 wide enough for the hose 73 to slip through when the hand shower 7 is being put in or taken out of the device. In addition the part 47 is formed centered on an axis 16 perpendicular to the longitudinal axis of the tube 5 with an inwardly projecting tubular center pin 43.

Figure 4:
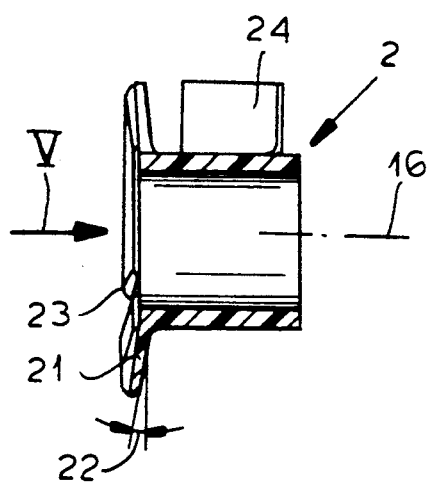
FIG. 4 is a vertical section through the retaining element.
Figure 5:
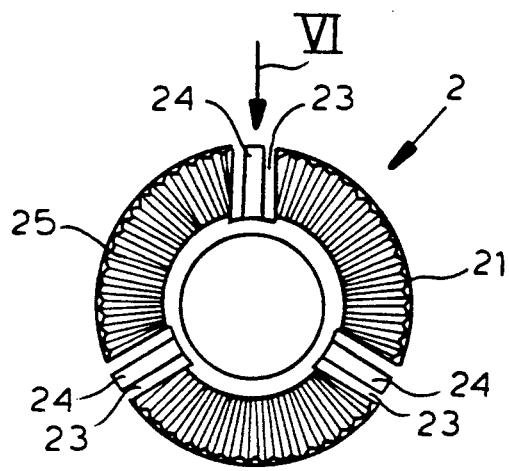
FIG. 5 is an end view taken in the direction of arrow V of FIG. 4.
Figure 6:
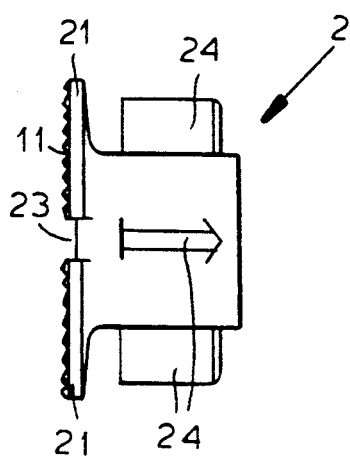
FIG. 6 is a side view taken in the direction of arrow VI of FIG. 5.

The retaining element 2 as seen in FIGS. 4 through 6 is basically tubular and is formed with three radially outwardly projecting, axially extending, and angularly equispaced fins 24 and on one end with three generally radially projecting and generally flat flanges 21. Each flange 21 is formed roughly at a 120° segment of a circular annulus and is tipped at an angle 22 of 5° to the center axis 16. Notches 23 aligned with the fins 24 separate the flanges 21 from each other and each flange 21 is formed on its outer face with radially extending coupling formations 25 in the form of triangular-section ridges having apex angles of 100°.

Figure 7:
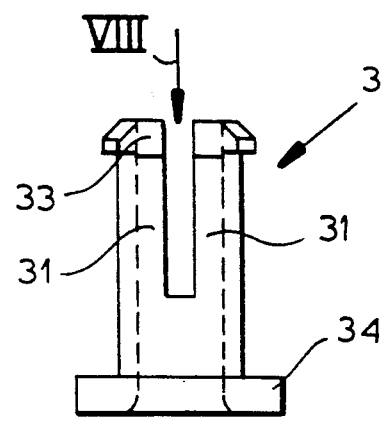
FIG. 7 is a side view of the locking bolt of the assembly.
Figure 8:
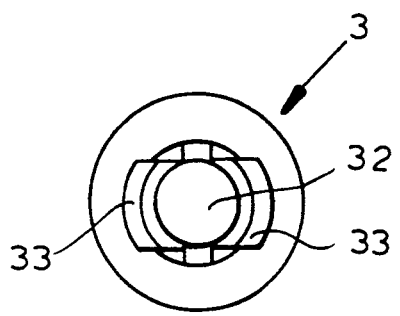
FIG. 8 is an end view taken in the direction of arrow VIII of FIG. 7.

FIGS. 7 and 8 show the locking bolt 3 which is basically tubular and is formed at one end with two diametrically opposite legs 31 each having an outwardly projecting foot 33. The bolt 3 defines a cylindrical central passage 32 having an inside diameter equal to slightly more than the outside diameter of the tubular pin 43 of the holder 4. The end of the bolt 3 opposite the feet 33 is formed with a radially outwardly projecting annular flange 34.

The support 1 as seen in FIGS. 9 through 11 has a central bore 14 adapted to fit around the tube 5, one side formed with a radially outwardly projecting centering tube or seat 16 centered on the axis 16 and diametrically opposite thereto a threaded seat 17 receiving the clamping nut 13. An annular planar surface perpendicular to the axis 16 is formed with circular field of fifty-four ridges 11 identical to and interfittable with the ridges 25 of the element 2. The ridges 11 are formed on the support 1 around the tube 15 as are a plurality of axially extending barb or snap fingers 12 adapted to engage in the seat formed by the groove 46 the holder 4. The outside diameters of the tube 15 is slightly less than the inside diameter of the cylindrically tubular body of the element 2 and the inside diameter of the tube 15 is slightly greater than the outside diameter of the locking bolt 3.

Figure 12:
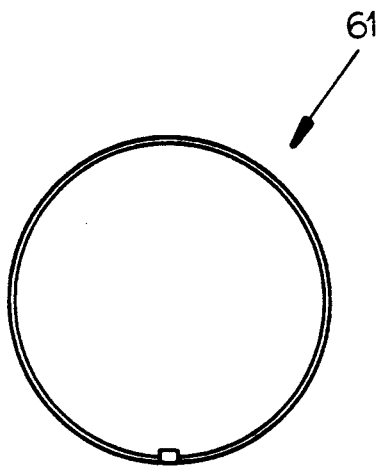
FIG. 12 is an end view of the cover sleeve of the assembly.
Figure 13:
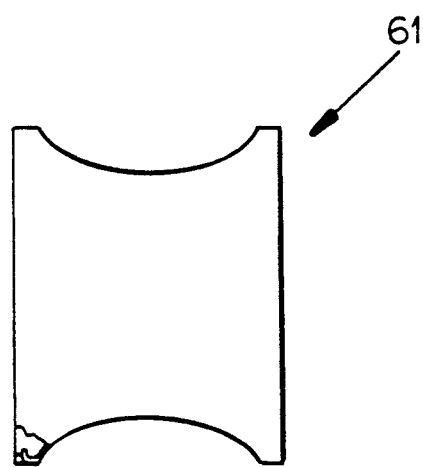
FIG. 13 is a partly sectional side view of the cover sleeve.
Figure 14:
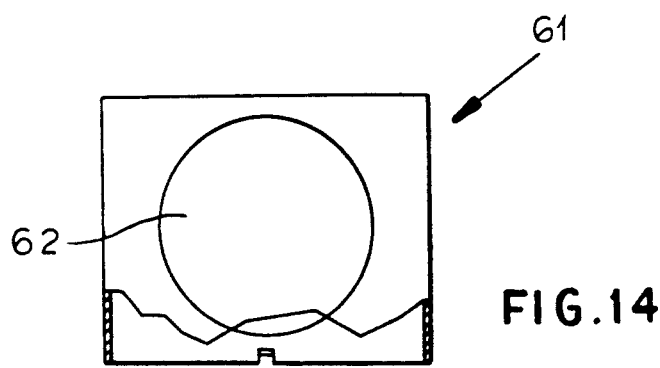
FIG. 14 is a partly sectional top view of the cover sleeve.

The above-described principal parts of the bracket according to this invention are all made of a durable plastic and are dressed up and, in fact, partly held together by the ring 6 and the cover sleeve 61 which is shown in detail in FIGS. 12 through 14. This sleeve 61 has a center hole 62 that is of the same diameter as the hole or passage 14. Both parts 6 and 61 can be made of metal and can have a particular color specifically intended for design purposes.

The bracket according to the invention is assembled by first slipping the retaining element 2 over the tube 15 until the formations 11 and 25 interengage. The locking bolt 3 is then pushed into the tube 15 until its feet snap out in a widened region 18 (See FIG. 11.) at its base, thereby locking the bolt 3 in place and pressing the element 2 against the holder 1 by the flange 34 pressing against the outer end of the element 2. This action elastically deforms the segments 21 so they extend perpendicular to the axis 6 eliminating the angle 22.

The pin 43 of the holder 4 is then pushed into the bolt 3 and the holder 4 is pushed toward the hole 14 until the snap tongues 12 on the support 1 click into the groove 46, thereby locking the parts 1 and 4 together. Simultaneously the pin 43 of the holder 4 extends all the way into the feet 33 of the legs 31, preventing them from being deflected inward and further locking the assembly together.

To finish the ring 6 is snapped in place, thereby retaining the fingers 12 in the groove 46, the cover sleeve 61 is installed, and then the nut 13 is screwed into the hole 17. The entire device can thereafter be slipped over the tube 5.

To raise or lower the bracket 1-6 on the tube 5 the nut 13 is loosened in a well known manner. To adjust the orientation of the hand shower 7 relative to the axis 16, it is merely twisted. This causes the formations 11 and 25 to slip relative to each other with elastic deformation of the flanges 21. There will be no significant wear and what surfaces might wear are completely out of sight so that the device can be counted on to retain its appearance over a long service life. With fifty-four teeth the support can move through 6.7° increments which allows for a very fine angular position adjustment.

We claim:

1. A mounting bracket for a hand shower having a support stem, the mounting bracket comprising:
   a support adapted to be stationarily fixed;
   a holder formed with a forked seat shaped to receive the hand-shower stem;
   interengaging formations on the holder and on the support for pivoting of the holder on the support about a normally horizontal axis while retaining the holder and support against relative axial movement;

an array of radially extending ridges formed on the support, surrounding the axis, and projecting toward the holder;

a retaining element having at least one elastically deformable flange formed with radially extending ridges interfitting with and complementary to the ridges of the support;

formations rotationally coupling the retaining element to the holder; and a locking bolt axially fixed in the support and axially pressing the retaining-element ridges against the support ridges, whereby the holder can be pivoted about the axis on the support with elastic deformation of the flange.

2. The hand-shower mounting bracket defined in claim 1 wherein the flange is inclined at an angle of about 5° to the axis.

3. The hand-shower mounting bracket defined in claim 1 wherein the flange is comprised of a plurality of identical circularly segmental segments.

4. The hand-shower mounting bracket defined in claim 1 wherein the flange has about 54 such ridges which have flank angles of about 100°.

5. The hand-shower mounting bracket defined in claim 1 wherein the bolt has axially extending legs having outwardly projecting feet that are elastically radially deflectable and that are axially engaged with the support.

6. The hand-shower mounting bracket defined in claim 1 wherein the rotational-coupling formations include radially outwardly projecting fins formed on the retaining element, and respective radially inwardly open seats formed on the holder and receiving the fins.

7. The hand-shower mounting bracket defined in claim 1 wherein the locking bolt is tubular and the holder is formed of an outer part formed with the forked seat and formed on the axis with a pin engaging coaxially in the locking bolt, and an annular inner part fixed on the outer part and formed with a radially open groove, the support having an annular array snap fingers with radially projecting ends engaged in the groove, the array being centered on the axis.

8. The hand-shower mounting bracket defined in claim 7 wherein the groove of the inner part opens radially outward, the bracket further comprising a cover ring overlying the snap fingers and retaining the fingers in the inner-part groove.

9. The hand-shower mounting bracket defined in claim 1 wherein the support, holder, element, and locking bolt are all made of plastic.

10. The hand-shower mounting bracket defined in claim 1, further comprising:

a vertical support rod, the support being formed with a vertically throughgoing passage through which the rod passes; and a threaded clamp element threaded in the support and engageable with the rod to lock the support on the rod at any position therealong.

11. A mounting bracket for a hand shower having a support stem, the mounting bracket comprising:

a support adapted to be stationarily fixed and formed with a centering tube centered on a normally horizontal axis;

a holder formed with a forked seat shaped to receive the hand-shower stem, a cylindrical centering rod extending along the axis and having a predetermined outside diameter;

interengaging formations on the holder and on the support for pivoting of the holder on the support about the horizontal axis while retaining the holder and support against relative axial movement;

an array of ridges formed on the support, extending perpendicularly to and radially with respect to the axis, and projecting axially toward the holder;

a retaining element having at least one elastically deformable flange formed with radially extending ridges interfitting with and complementary to the ridges of the support;

formations rotationally coupling the retaining element to the holder; and a tubular locking bolt axially fixed in the centering tube of the support and axially pressing the retaining-element ridges against the support ridges, whereby the holder can be pivoted about the axis on the support with elastic deformation of the flange, the centering pin of the holder fitting coaxially in the bolt.

* * * * *